(12) United States Patent
Jost et al.

(10) Patent No.: US 7,960,061 B2
(45) Date of Patent: Jun. 14, 2011

(54) ELECTROLYTE COMPOSITION IN ADDITION TO THE USE THEREOF AS AN ELECTROLYTE MATERIAL FOR ELECTROCHEMICAL ENERGY STORAGE SYSTEMS

(75) Inventors: Carsten Jost, Duesseldorf (DE); Michael Holzapfel, Bern (CH); Petr Novak, Brugg (CH); Anna Prodi-Schwab, Essen (DE); Volker Hennige, Duelmen (DE); Christian Hying, Rhede (DE)

(73) Assignee: Degussa AG, Duesseldorf (DE)

( * ) Notice: Subject to any disclaimer, the term of this patent is extended or adjusted under 35 U.S.C. 154(b) by 1081 days.

(21) Appl. No.: 11/547,829

(22) PCT Filed: Feb. 24, 2005

(86) PCT No.: PCT/EP2005/050788
§ 371 (c)(1),
(2), (4) Date: Mar. 9, 2007

(87) PCT Pub. No.: WO2005/104288
PCT Pub. Date: Nov. 3, 2005

(65) Prior Publication Data
US 2007/0212615 A1 Sep. 13, 2007

(30) Foreign Application Priority Data
Apr. 20, 2004 (DE) .......................... 10 2004 018 929

(51) Int. Cl.
*H01M 10/40* (2006.01)
*H01M 2/14* (2006.01)
*H01M 2/16* (2006.01)

(52) U.S. Cl. .................... 429/326; 429/330; 429/231.95; 429/247; 429/129

(58) Field of Classification Search .................... None
See application file for complete search history.

(56) References Cited

U.S. PATENT DOCUMENTS
2004/0038105 A1  2/2004 Hennige et al.

FOREIGN PATENT DOCUMENTS

| | | |
|---|---|---|
| JP | 11-307121 | 11/1999 |
| JP | 2002-373704 | 12/2002 |
| WO | WO 97/02252 | 1/1997 |
| WO | WO 01/04097 A2 | 1/2001 |
| WO | WO 01/93363 | * 12/2001 |
| WO | WO 01/93363 A2 | 12/2001 |
| WO | WO 03/021697 A2 | 3/2003 |
| WO | WO 03/072231 A2 | 9/2003 |
| WO | WO 03/073534 A2 | 9/2003 |
| WO | WO 2004/021469 A2 | 3/2004 |
| WO | WO 2004/021474 A1 | 3/2004 |
| WO | WO 2004/021475 A1 | 3/2004 |
| WO | WO 2004/021476 A1 | 3/2004 |
| WO | WO 2004/021477 A1 | 3/2004 |
| WO | WO 2004/021499 A2 | 3/2004 |

OTHER PUBLICATIONS

U.S. Appl. No. 11/578,664, filed Oct. 18, 2006, Hoerpel, et al.
Peter Wasserscheid, et al., "Ionische Flüssigkeiten—neue ..Lösungen: für die Übergangsmetallkatalyse", Aufsätze, 2000, Cover page and pp. 3927-3945.
George E. Blomgren, "Electrolytes for advanced batteries", Journal of Power Sources, XP4363132A, vol. 81-82, 1999, pp. 112-118.
Takaya Sato, et al., "Ionic liquids containing carbonate solvent as electrolytes for lithium ion cells". Journal of Power Sources, XP4618361A, vol. 138, 2004, pp. 253-261.
H. Buqa, et al., "Recent Improvements in Electrochemical Performance of Graphite Electrode for Lithium-Ion Batteries", ITE Letters on Batteries, New Technologies and Medicine, vol. 4, No. 1, 2003. pp. 38-43.
L. Cammarata, et al., "Molecular states of water in room temperature ionic liquids", Phys. Chem. Chem. Phys., vol. 3, 2001, pp. 5192-5200.
Pierre Bonhôte, et al., "Hydrophobic, Highly Conductive Ambient-Temperature Molten Salts", Inorganic Chemistry, vol. 35, No. 5, 1996. cover page and pp. 1168-1178.
George E. Blomgren, "Liquid electrolytes for lithium and lithium-ion batteries", Journal of Power Sources, XP4430190A, vol. 119-121, 2003, pp. 326-329.
U.S. Appl. No. 11/917,914, filed Dec. 18, 2007, Holzapfel, et al.
U.S. Appl. No. 12/670,483, filed Jan. 25, 2010, Pascaly, et al.

* cited by examiner

*Primary Examiner* — Dah-Wei Yuan
*Assistant Examiner* — Angela J. Martin
(74) *Attorney, Agent, or Firm* — Oblon, Spivak, McClelland, Maier & Neustadt, L.L.P.

(57) ABSTRACT

The invention relates to an electrolyte composition consisting of an ionic liquid, a conducting salt, a film former and a viscosity modifier and also to the use of the electrolyte composition of the present invention as an electrolyte material for electrochemical energy storage systems, especially for lithium-metal and lithium-ion batteries.

19 Claims, 11 Drawing Sheets

ELECTROLYTE COMPOSITION IN ADDITION TO THE USE THEREOF AS AN ELECTROLYTE MATERIAL FOR ELECTROCHEMICAL ENERGY STORAGE SYSTEMS

This invention concerns an electrolyte composition and also its use in electrochemical energy storage systems.

Lithium-ion batteries are energy storage systems having a very high energy density (up to 180 Wh/kg). These lithium-ion batteries are used in particular in the sector of portable electronics, as for example in laptops, camcorders, handhelds or cellphones, also known as mobiles. The negative electrode material here consists in particular of graphitic carbon, conductivity carbon black and a suitable binder material. This "graphite electrode" is used because of its stable cycling properties and its—compared with lithium metal (which is used in so-called "lithium-metal batteries")—fairly high handling safety, even though graphitic carbon has a very low potential of about 100-200 mV vs. $Li/Li^+$. When the lithium-ion battery is charged, lithium ions intercalate in the graphitic carbon, the lithium ions being reduced in the process by electron uptake. This process takes place in reverse at discharge. The positive electrode material used is mostly lithium transition metal oxides, such as for example $LiCoO_2$, $LiNiO_2$ or $LiMn_xNi_yCO_{1-x-y}O_2$, which have a high potential (3.8-4.2 V vs. $Li/Li^+$).

One of the reasons for the high energy density of lithium-ion batteries is the high potential window due to the electrode combination, which can be up to 4 V. This high potential difference is very demanding of the electrolyte materials used, in that for example a combination of a polar liquid with a lithium salt is used as an electrolyte in which the lithium salt performs the ion conduction function. Under the given conditions in a lithium-ion battery, prior art electrolytes are generally not durably stable, since not only the electrolyte liquid but also the lithium conducting salt can be reduced at the negative electrode. Lithium-ion batteries are industrially useful by virtue of the fact that an important constituent of conventional electrolytes, for example ethylene carbonate, forms a solid electrolyte interphase (SEI) film on the surface of the graphite in the course of the reduction at the negative electrode, this film allowing ion conduction but preventing any further reduction of the electrolyte.

Ethylene carbonate, which is solid at room temperature, is generally used in the form of a mixture with low-viscosity solvents, such as dimethyl carbonate (DMC) or ethyl methyl carbonate (EMC), to increase the conductivity. These low-viscosity additives render the electrolyte volatile and highly flammable at elevated temperatures.

Blomgren et al. describe the use of ionic liquids as electrolyte materials in the lithium-ion battery (A. Webber, G. E. Blomgren, Advances in Lithium-Ion Batteries (2002), 185-232; G. E. Blomgren, J. Power Sources 2003, 119-121, 326-329).

Covalent Associates in WO 01/93363 describe a non-flammable electrolyte consisting of a salt having an organic cation or of an ionic liquid, an organic solvent, an acrylate polymer or fluoropolymer, and a conducting salt.

Yuasa Corporation in JP 2002373704 describes a non-aqueous electrolyte consisting of 1-ethyl-3-methylimidazolium, a lithium salt and a cyclic ester having a π bond.

Mitsubishi Chemicals Industries Ltd. in JP 11307121 describes an electrolyte consisting of an ionic liquid based on quaternary imidazolium or pyridinium ions and from 1% to 130% by volume of an organic cyclic compound.

The present invention has for its object to provide an electrolyte composition which is low in flammability and thus leads to safer operation of lithium-ion batteries.

It has now been found that, surprisingly, a low-flammable electrolyte composition consisting of an ionic liquid, a conducting salt and a film former can be used as an electrolyte in the lithium-ion battery and can be operated with stable cycling by addition of a suitable film former. The electrolyte composition of the present invention has the advantage of including not more than 20% by weight of volatile constituents, if any. The electrolyte composition of the present invention, which is based on non-flammable ionic liquids, accordingly includes almost no combustible constituents and accordingly the useful temperature range of the lithium-ion battery is less restricted than with prior art electrolyte compositions. The use of the electrolyte composition of the present invention can further enhance the tolerance of the lithium-ion battery to incorrect handling, such as overcharging for example. The almost complete exclusion of organic solvents from the electrolyte composition of the present invention makes it possible to use separator materials in the lithium-ion battery which are attacked by organic solvents in certain circumstances. This is of advantage in the case of polymeric-based batteries in particular, since the use of the electrolyte composition of the present invention does not lead to any problems with regard to leachiness or durability. The use of the electrolyte composition of the present invention in lithium-ion batteries leads to a low loss of reversible capacity on the part of the lithium-ion battery even in the case of a high number of charging and discharging cycles. The use of the electrolyte composition of the present invention as an electrolyte material enhances the safety of battery operation appreciably and improves especially the low and high temperature performance. The electrolyte composition of the present invention leads to a stable charging and discharging performance for lithium-ion batteries. It was determined that, surprisingly, the use of the electrolyte composition of the present invention for producing a lithium-ion battery while using a ceramic separator at the same time can achieve a further improvement in handling safety, since the electrolyte composition of the present invention can be free or almost free of volatile constituents and a ceramic separator is notable for high thermal stability. It was further determined that this combination of the electrolyte composition of the present invention with a ceramic separator possesses improved thermal stability on prolonged heating at 100° C. and 150° C. Furthermore, the electrolyte composition of the present invention shows in combination with a ceramic separator in a lithium-ion battery improved wetting of the ceramic separator by the electrolyte composition of the present invention.

Figure 1A:
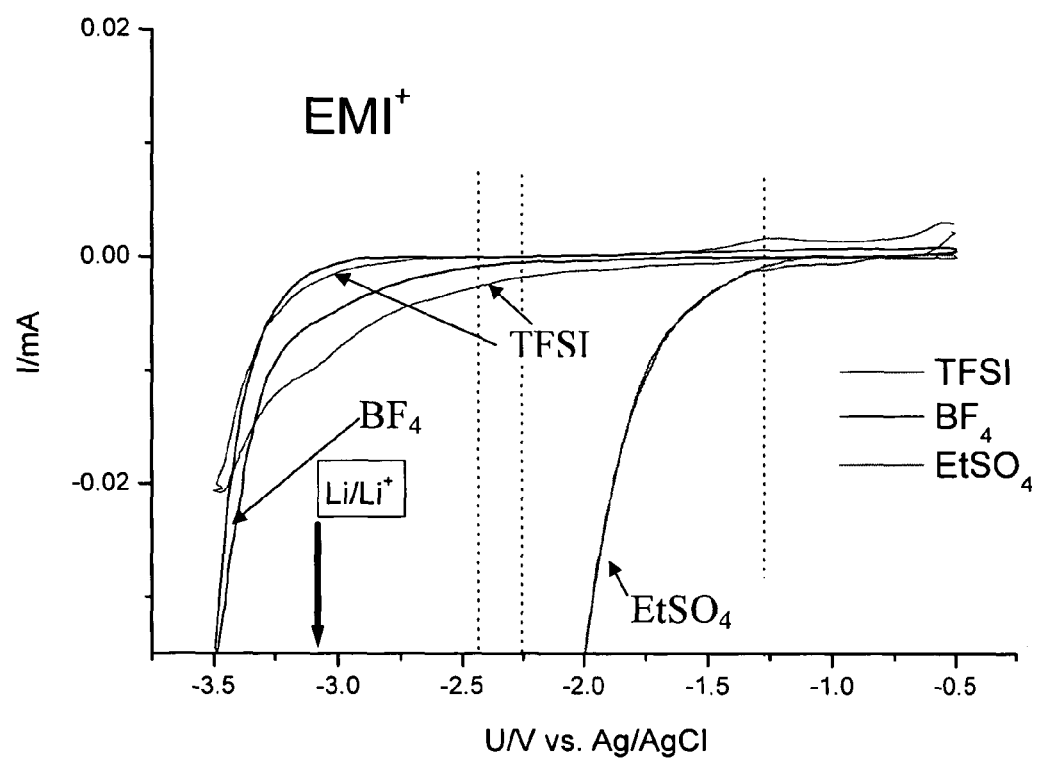
FIG. 1a shows the determination of an electrochemical window described in the examples.

The present invention provides an electrolyte composition comprising a base component consisting of
  80% to 99.5% by weight of at least one ionic liquid (A) which has a melting point of less than 100° C.,
  0.5% to 10% by weight of a film former (B) and
  0% to 10% by weight of a viscosity modifier (C),
and a conducting salt (D) in a fraction ranging from 0.25 mol/(kg of base component) to the solubility limit in the base component.

The present invention further provides for the use of the electrolyte composition of the present invention in electrochemical energy storage systems and also a lithium-ion battery comprising the electrolyte composition of the present invention.

The electrolyte composition of the present invention comprises a base component consisting of
  80% to 99.5% by weight of at least one ionic liquid (A) which has a melting point of less than 100° C.,
  0.5% to 10% by weight of a film former (B) and
  0% to 10% by weight of a viscosity modifier (C),
and a conducting salt (D) in a fraction ranging from 0.25 mol/(kg of base component) to the solubility limit in the base component.

The electrolyte composition of the present invention preferably consists of a base component consisting of
  80% to 99.5% by weight of at least one ionic liquid (A) which has a melting point of less than 100° C.,
  0.5% to 10% by weight of a film former (B) and
  0% to 10% by weight of a viscosity modifier (C),
and a conducting salt (D) in a fraction ranging from 0.25 mol/(kg of base component) to the solubility limit in the base component.

A preferred embodiment of the electrolyte composition of the present invention comprises no viscosity modifier. This can distinctly reduce the fraction of volatile components in the electrolyte composition of the present invention. The electrolyte composition of the present invention thus preferably comprises a base component consisting of
  90% to 99.5% by weight of at least one ionic liquid (A) which has a melting point of less than 100° C. and
  0.5% to 10% by weight of a film former (B),
but especially the base component consists of:
  92% to 98% by weight of at least one ionic liquid (A) which has a melting point of less than 100° C. and
  2% to 8% by weight of a film former (B).

Ionic liquids in the sense of this invention are salts which have a melting point of not more than 100° C. Ionic liquids are reviewed for example by Welton (Chem. Rev. 99 (1999), 2071) and Wasserscheid et al. (Angew. Chem. 112 (2000), 3926). The electrolyte compositions of the present invention preferably comprise ionic liquids (A) which have organic cations. The electrolyte compositions of the present invention preferably comprise ionic liquids (A) which have one cation or two or more cations as per the following structures:

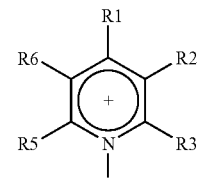

1

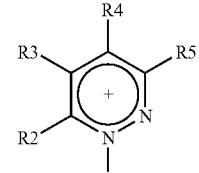

2

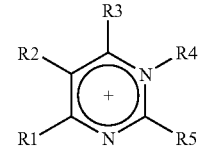

3

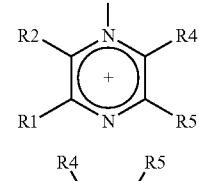

4

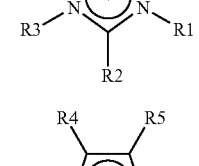

5

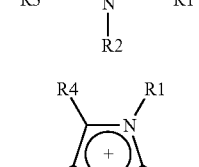

6

7

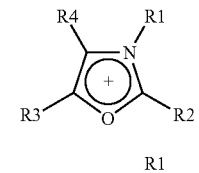

8

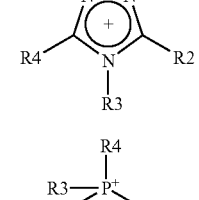

9

10

-continued

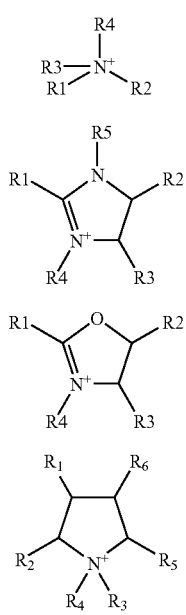

where R1, R2, R3, R4, R5 and R6, identically or differently, and hydrogen, hydroxyl, alkoxy, sulfanyl (R—S—), $NH_2$—, $NHR''$—, $NR''_2$ group, wherein $R''$ is an alkyl group having 1 to 8 carbon atoms, or can be halogen, especially F, Cl, Br or I, a linear or branched aliphatic hydrocarbon radical having 1 to 20, preferably 1 to 8 and more preferably 1 to 4 carbon atoms, which may be substituted, for example with a hydroxyl, alkyl having 1 to 8 and preferably 1 to 4 carbon atoms and/or halogen group, or unsubstituted, a cycloaliphatic hydrocarbon radical having 5 to 30, preferably 5 to 10 and more preferably 5 to 8 carbon atoms, which may be substituted, for example with a hydroxyl, alkyl having 1 to 8 and preferably 1 to 4 carbon atoms and/or halogen group, or unsubstituted, an aromatic hydrocarbon radical having 6 to 30, preferably 6 to 12 and more preferably 6 to 10 carbon atoms, which may be substituted, for example with a hydroxyl, alkyl having 1 to 8 and preferably 1 to 4 carbon atoms and/or halogen group, or unsubstituted, an alkylaryl radical having 7 to 40, preferably 7 to 14 and more preferably 7 to 12 carbon atoms, which may be substituted, for example with a hydroxyl, alkyl having 1 to 8 and preferably 1 to 4 carbon atoms and/or halogen group, or unsubstituted, a linear or branched aliphatic hydrocarbon radical which is interrupted by one or more heteroatoms (oxygen, NH, $NCH_3$) and has 2 to 20 carbon atoms, which may be substituted, for example with a hydroxyl, alkyl having 1 to 8 and preferably 1 to 4 carbon atoms and/or halogen group, or unsubstituted, a linear or branched aliphatic hydrocarbon radical which is interrupted by one or more functionalities selected from the group —O—C(O)—, —(O)C—O—, —NH—C(O)—, —(O)C—NH, —($CH_3$)N—C(O)—, —(O)C—N($CH_3$)—, —S(O)$_2$—O—, —O—S(O)$_2$—, —S(O)$_2$—NH—, —NH—S(O)$_2$—, —S(O)$_2$—N($CH_3$)—, —N($CH_3$)—S(O)$_2$—, and has 2 to 20 carbon atoms, which may be substituted, for example with a hydroxyl, alkyl having 1 to 8 and preferably 1 to 4 carbon atoms and/or halogen group, or unsubstituted, a terminally —OH, —$NH_2$, —N(H)$CH_3$-functionalized linear or branched aliphatic hydrocarbon radical having 1 to 20 carbon atoms, which may be substituted, for example with a hydroxyl, alkyl having 1 to 8 and preferably 1 to 4 carbon atoms and/or halogen group, or unsubstituted.

The electrolyte composition of the present invention preferably comprises at least one ionic liquid (A) having a cation based on ammonium, pyridinium, pyrrolidinium, pyrrolinium, oxazolium, oxazolinium, imidazolium, thiazolium or phosphonium ions.

The ionic liquids (A) included in the electrolyte compositions of the present invention preferably have one or more anions selected from phosphate, halophosphates, especially hexafluorophosphate, alkylphosphates, arylphosphates, nitrate, sulfate, bisulfate, alkylsulfates, arylsulfates, perfluorinated alkyl- and arylsulfates, sulfonate, alkylsulfonates, arylsulfonates, perfluorinated alkyl- and arylsulfonates, especially trifluoromethylsulfonate, tosylate, perchlorate, tetrachloroaluminate, heptachlorodialuminate, tetrafluoroborate, alkylborates, arylborates, amides, especially perfluorinated amides, dicyanamide, saccharinate, thiocyanate, carboxylates, acetates, preferably trifluoroacetate, and bis(perfluoroalkylsulfonyl)amide anions.

In a particular embodiment of the electrolyte composition of the present invention, the electrolyte composition preferably comprises ionic liquids (A) with at least one salt where the cation is an imidazolium, a pyridinium, especially a pyridinium substituted in position 4, an ammonium or phosphonium ion having the following structures:

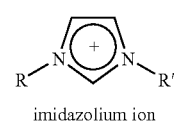

imidazolium ion

5a

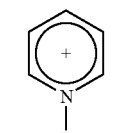

pyridinium ion

1a

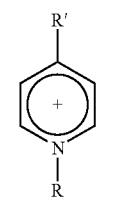

pyridinium ion

1b

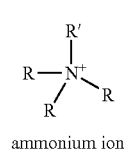

ammonium ion

11a

-continued

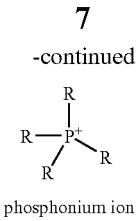

phosphonium ion where R and R' may be identical or different, substituted, for example with a hydroxyl, alkyl having 1 to 8 and preferably 1 to 4 carbon atoms and/or halogen group, or unsubstituted alkyl, preferably an alkyl group having 1 to 8 carbon atoms, or aryl groups, preferably an acryl group having 6 to 12 carbon atoms, R and R' preferably having different meanings, and where an anion is selected from tetrafluoroborate, alkylborate, especially triethylhexylborate, arylborate, halophosphate, especially hexafluorophosphate, nitrate, sulfonates, especially perfluorinated alkyl- and arylsulfonates, bisulfate, alkylsulfates, especially perfluorinated alkyl- and arylsulfates, thiocyanates, perfluorinated amides, dicyanamide and/or bis(perfluoroalkylsulfonyl)amide and especially bis(trifluoromethanesulfonyl)amide $((CF_3SO_2)_2N)$.

The electrolyte composition of the present invention preferably comprises ionic liquids (A) based on 1-alkyl'-3-alkylimidazolium or alkyl'trialkylammonium ions, wherein the alkyl and alkyl' substituents, which are not identical, have from 1 to 8 hydrocarbon atoms, but particular preference is given to ionic liquids selected from 1-ethyl-3-methylimidazolium bis(trifluoromethanesulfonyl)imide, 1-ethyl-3-methylimidazolium tetrafluoroborate, 1-ethyl-3-methylimidazolium dicyanamide, 1-ethyl-3-methylimidazolium ethylsulfate, 1-butyl-3-methylimidazolium bis(trifluoromethanesulfonyl)imide, 1-butyl-2,3-dimethylimidazolium dicyanamide and/or methyltrioctylammonium bis(trifluoromethanesulfonyl)imide.

A particular embodiment of the electrolyte composition of the present invention comprises at least one ionic liquid (A) comprising a cation based on an ammonium, preferably tetraalkylammonium and more preferably trimethylalkylammonium and/or triethylalkyl-ammonium ion.

Figure 1B:
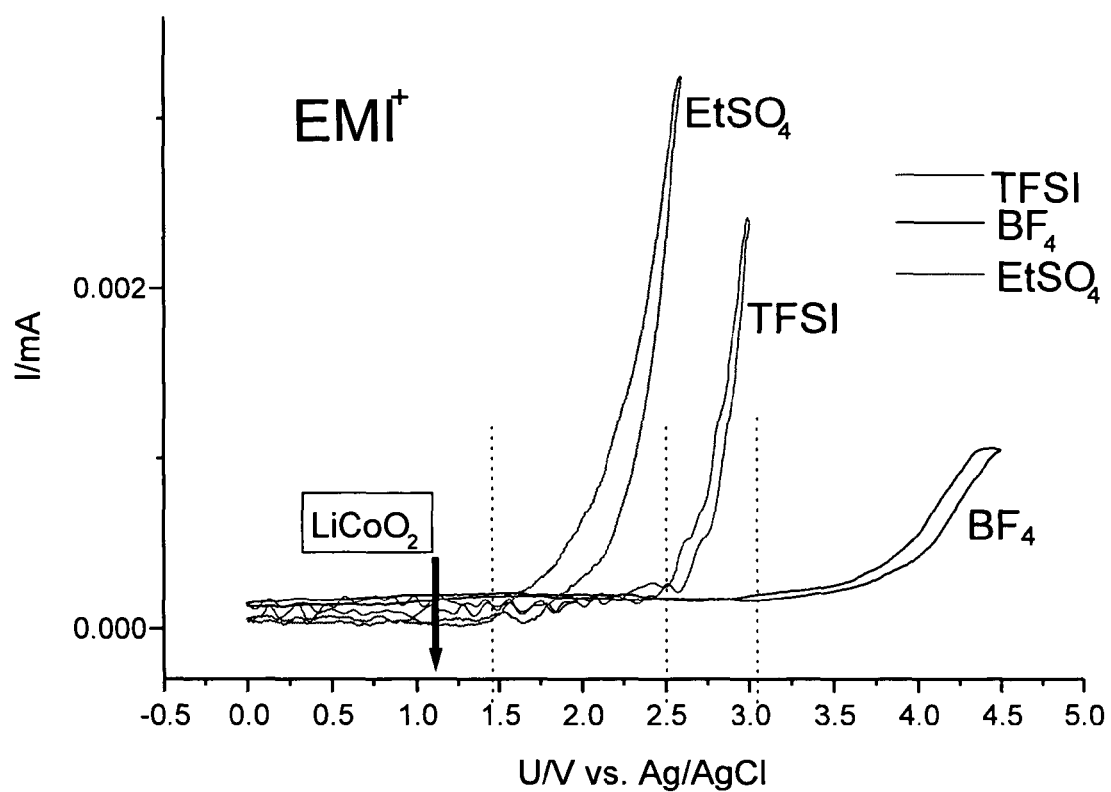
FIG. 1b shows the determination of an electrochemical window using a measurement that is cathodic on copper and anodic on aluminum.

In a further embodiment the electrolyte composition of the present invention comprises an ionic liquid (A) based on a cation as per FIG. 1b, especially based on 4-alkylpyridinium ion and preferably based on 4-methylpyridinium ion.

The electrolyte composition of the present invention may also comprise a mixture of at least two different ionic liquids (A). If this is the case, the electrolyte composition of the present invention may comprise at least two different anions and/or two different cations based on the ionic liquid (A).

The ionic liquid (A) is present in the base component of the electrolyte composition of the present invention at a level which is preferably in the range from 80% to 99.5% by weight, more preferably in the range from 90% to 99% by weight, even more preferably in the range from 92% to 98% by weight and most preferably in the range from 94% to 97% by weight, based on the base component.

The conducting salt (D) in the electrolyte composition of the present invention is preferably a lithium compound and more preferably $LiPF_6$, $LiClO_4$, $LiAsF_6$, $LiBF_4$, $LiCF_3SO_3$, $LiN(CF_3SO_2)_2$, $LiN(SO_2CF_2CF_3)_2$, $LiSbF_6$, $LiAlCl_4$, $LiGaCl_4$, $LiCl$, $LiNO_3$, $LiSCN$, $LiO_3SCF_2CF_3$, $LiC_6F_5SO_3$, $LiO_2CCF_3$, $LiFSO_3$, $LiB(C_6H_5)_4$, $LiB(C_2O_4)_2$, lithium fluoroalkylphosphate and/or $Li(NTf_2)$. The concentration of conducting salt in the electrolyte composition of the present invention is preferably in the range from 0.25 mol/kg to the solubility limit of the conducting salt (D) in the base component, preferably in the range from 0.25 to 1.5 mol/kg, more preferably in the range from 0.4 to 1.0 mol/kg and even more preferably 0.5 mol/kg based on the base component.

The film former (B) in the electrolyte composition of the present invention is preferably an organic compound, preferably an organic carbonate compound and more preferably vinylene carbonate. The film former in the electrolyte composition of the present invention is in a particular embodiment a compound selected from ethylene sulfite, (meth)acrylonitrile, ethylene carbonate, especially halogenated ethylene carbonate, especially chloroethylene carbonate, lithium-borato complexes, especially lithium bis(oxalato)borate or lithium bis(biphenylato)borate, maleic anhydride, pyridine, dimethylacetamide, aniline, pyrrole, thionyl chloride, gamma-butyrolactone, diallyl carbonate, cyanomethyl formate, 4,4'-bipyridyl, N,N-dimethylacetamide or derivatives of these compounds.

A particular embodiment of the electrolyte composition of the present invention has as film former (B) a finctionalized ionic liquid having organic cations as per at least one of the structures 1 to 14, wherein at least one of the substituents R1, R2, R3, R4, R5 and R6 has a multiple bond and preferably a double bond.

The amount of film former (B) in the base component of the electrolyte composition of the present invention is preferably in the range from 0.5% to 10% by weight, more preferably in the range from 2% to 8% by weight and even more preferably in the range from 3% to 6% by weight based on the base component.

The viscosity modifier (C) in the electrolyte composition of the present invention is preferably an organic aprotic solvent, more preferably carbonates, or else 1,2-dimethoxyethane, tetrahydrofuran, 2-methyltetrahydrofuran, diethylene glycol dialkyl ester, dioxolane, propylene oxide, dimethylsulfoxide, dimethyl formamide, formamide, nitromethane, gamma-butyrolactone, alkyl carbonate and/or methyllactate. A flame retardant selected from chlorinated or brominated hydrocarbons, from halogenated or alkyl- or aryl-substituted phosphanes, phosphates, phosphonates, phosphonites and phosphites can also be added to the viscosity modifier (C) in this case. The viscosity modifier (C) in the inventive electrolyte composition may also be an ionic liquid, which makes it possible to obtain an inventive electrolyte composition which includes no or almost no volatile components. In general, the use of the viscosity modifier (C) in the electrolyte composition of the present invention is dependent on the ionic liquid (A) used and serves to optimize the viscosity of the electrolyte composition of the present invention, preferably by lowering it. The viscosity modifier (C) content of the base component of the electrolyte composition of the present invention is in the range from 0% to 10% by weight and more preferably in the range from 0% to 5% by weight based on the base component.

The present invention further provides for the use of the electrolyte composition of the present invention for producing electrochemical energy storage systems. The electrolyte compositions of the present invention are preferably used for producing lithium-metal and/or lithium-ion batteries. The electrolyte compositions of the present invention are more preferably used for producing lithium-ion batteries.

The electrolyte composition of the present invention is preferably used for producing lithium-ion batteries comprising a ceramic separator, preferably a sheetlike flexible substrate which has a multiplicity of openings and has a porous inorganic coating on and in this substrate, the material of the substrate being selected from woven or non-woven nonelectroconductive polymeric or natural fibers and having a porosity of more than 50%. The porosity of this substrate is preferably in the range from 50% to 97%, more preferably in the range from 75% to 90% and most preferably in the range from 80% to 90%. Porosity here is defined as the volume of the nonwoven (100%) minus the volume of the fibers of the nonwoven, i.e., the nonwoven's volume fraction which is not occupied by material. The volume of the nonwoven can be calculated from the dimensions of the nonwoven. The volume of the fibers follows from the measured weight of the contemplated nonwoven and the density of the polymeric fibers. High substrate porosity ensures a comparatively high porosity for the present invention's hybridic separator as well, which is why a comparatively high uptake of electrolyte can be achieved with the separator of the present invention.

The electrolyte composition of the present invention is preferably used for producing a lithium-ion battery whose separators are less than 80 µm, preferably less than 75 µm, more preferably from 10 to 75 µm and most preferably from 15 to 50 µm in thickness. Low thickness means that the separator, when used with an electrolyte, has a particularly low electrical resistance. The separator itself of course has a very high electrical resistance, since it itself has to have insulating properties.

When the electrolyte composition of the present invention is used for producing a lithium-ion battery, the substrate material for the separator used preferably comprises nonelectrico conductive fibers of polymers which are preferably selected from polyacrylonitrile (PAN), polyesters, polyamide (PA), polyimide (PI), polytetrafluoroethylene (PTFE) and/or polyolefin (PO), for example polypropylene (PP) or polyethylene (PE) or mixtures of such polyolefins. Any other polymer stable in these very reactive media can be used as well as can stable natural fibers, but the materials mentioned above are particularly preferred materials. These polymeric fibers are preferably from 0.1 to 25 µm and more preferably from 1 to 10 µm in diameter.

The material for the substrate is selected from woven or non-woven polymeric fibers. Woven polymeric fibers can be woven fabrics for example. Non-woven polymeric fibers can be formed-loop knits, nonwovens or felts for example. It is particularly preferable for the material of the flexible substrate to be a nonwoven which comprises polymeric fibers.

The substrate of the separator used in the present invention's use of the electrolyte composition of the present invention comprises in particular a nonwoven from 1 to 200 µm, preferably from 5 to 50 µm and most preferably from 10 to 30 µm in thickness. The thickness of the substrate has a considerable influence on the properties of the separator, since not only the flexibility but also the sheet resistance of the electrolyte-drenched separator is dependent on the thickness of the substrate. In addition, thinner separators permit an increased packing density in a battery stack, so that a larger amount of energy can be stored in the same volume. Furthermore, the limiting current density can likewise be increased as a result, through enlargement of the electrode area. The basis weight of the separator substrate is in particular in the range from 1 to 50 g/m$^2$, preferably in the range from 2 to 30 g/m$^2$ and more preferably in the range from 4 to 15 g/m$^2$.

The separator of the use according to the present invention comprises a porous electroinsulating ceramic coating. It can be advantageous for the coating which is present on and in the substrate to comprise a nonelectroconductive oxide of the metals Al, Zr and/or Si. The porosity of this separator is preferably in the range from 10% to 80%, more preferably in the range from 20% to 70% and even more preferably in the range from 40% to 60%. Porosity as understood here refers to the accessible, i.e., open, pores. Porosity in this sense can be determined by the familiar method of mercury porosimetry or can be calculated from the volume and density of the materials used on the assumption that open pores only are present.

When the electrolyte composition of the present invention is put to the use of the present invention, the separators employed are characterized by a breaking strength of at least 1 N/cm, preferably at least 3 N/cm and most preferably greater than 6 N/cm. The separators employed are preferably bendable down to any radius down to 100 mm, more preferably down to 50 mm, even more preferably down to 2 mm and most preferably down to 0.1 mm, without damage. The high breaking strength and the good bendability of the separator employed has the advantage that the separator is able to accommodate changes in electrode geometry which occur in the course of battery charging and discharging without being damaged. Bendability also has the advantage that this separator can be used to produce commercially standardized wound cells. In these cells, the electrode/separator plies are wound up together in spirals of a standardized size and contacted.

In general, useful ceramic separators for the present invention's use of the electrolyte composition of the present invention consist of a ceramic material applied to a substrate, such as a polymeric fibrous nonwoven for example. Such ceramic separators are described inter alia in the following patent applications: WO 03/021697, WO 03/072231, WO 03/073534, WO 2004/021469, WO 2004/021474, WO 2004/021475, WO 2004/021476, WO 2004/021477 and WO 2004/021499.

The electrolyte composition is further used according to the present invention when it is employed for producing lithium-ion batteries whose electrode material comprises nanoscale silicon particles. The electrolyte composition of the present invention is preferably employed in the case of lithium-ion batteries whose electrode material comprises 5-85% by weight of nanoscale silicon particles having a BET surface area in the range from 5 to 700 m$^2$/g and an average primary particle diameter in the range from 5 to 200 nm, 0-10% by weight of conductivity carbon black, 5 to 80% by weight of graphite having an average particle diameter in the range from 1 µm to 100 µm and 5-25% by weight of a binder, the fractions of the components summing to not more than 100% by weight.

The present invention further provides a lithium-ion battery comprising the electrolyte composition of the present invention. As well as the electrolyte composition of the present invention the lithium-ion battery of the present invention preferably comprises a separator comprising a sheetlike flexible substrate having a multiplicity of openings and a porous inorganic coating on and in this substrate, the material for the substrate being selected from woven or non-woven nonelectroconductive polymeric or natural fibers and having a porosity of more than 50%. As well as the electrolyte composition of the present invention the lithium-ion battery of the present invention may fuirther comprise at least one electrode which consists of an electrode material comprising nanoscale silicon powder. This electrode material preferably comprises 5-85% by weight of nanoscale silicon particles having a BET surface area in the range from 5 to 700 m$^2$/g and an average primary particle diameter in the range from 5 to 200 nm, 0-10% by weight of conductivity carbon black, 5-80% by weight of graphite having an average particle diameter in the range from 1 µm to 100 µm and 5-25% by weight of a binder, the fractions of the components summing to not more than 100% by weight.

As used herein, nanoscale silicon powder refers to a silicon powder having an average primary particle diameter in the range from 5 to 200 rn and preferably in the range from 5 to 100 nm, or primary particles agglomerated or aggregated together to a size in the range from 20 to 1000 mn. Particle diameters are determined from transmission electron micrographs (TEM).

The electrolyte compositions of the present invention will now be more particularly described with reference to examples without the invention being limited to this embodiment.

EXAMPLE 1

Determining the Electrochemical Windows of Ionic Liquids

To determine the stability with regard to electrochemical processes of the electrolyte composition of the present invention, the electrochemical window is determined. This is done by continuously raising the potential difference applied to a suitable pair of electrodes which dips into the electrolyte. This makes it possible to measure at which voltage the electrolyte decomposes and under which conditions no decomposition of the electrolyte takes place. The determination of the electrochemical window of the electrolyte composition is carried out in a glass cell under argon without addition of a lithium salt, of the film former or of a viscosity modifier. The voltage sweep rate chosen is 5 mV/s. The reference used is an AgCl-coated Ag rod, which has a potential of −3.08 V vs. Li/Li$^+$. The measurement is cathodic on copper (see FIG. 1a), but anodic on aluminum (see FIG. 1b). The electrolyte used is the following ionic liquids (A), which are the main constituent of the electrolyte composition of the present invention:

1-ethyl-3-methylimidazolium bis(trifluoromethanesulfonyl)imide (EMI-TFSI)

1-ethyl-3-methylimidazolium tetrafluoroborate (EMI-BF4)

1-ethyl-3-methylimidazolium ethylsulfate (EMI-EtSO$_4$)

The potentials at lithium deposition and hence approximately at the intercalation of lithium in graphite and of LiCoO$_2$ are reported as well in FIGS. 1a and 1b for comparison. It is apparent that the ionic liquids are anodically (i.e., oxidatively) stable to LiCoO$_2$, whereas they are cathodically (i.e., reductively) decomposed before attainment of the lithium potential. The respective electrochemical potentials of the lithium and LiCoO$_2$ electrodes are identified by "Li/Li$^+$" and "LiCoO$_2$" in FIGS. 1a and 1b respectively. To ensure electrochemical stability, the sample (ionic liquids in this case) must not have any current flux within this potential region (i.e., to the right of "Li/Li$^+$" and to the left of "LiCoO$_2$" in the respective figures). This is only the case for the positive electrode, i.e., LiCoO$_2$, in the above examples. The ionic liquids are consequently not stable to lithium. In FIGS. 1a and 1b, I/mA denotes the current in mA flowing between working electrode and counterelectrode and U/V denotes the electrochemical potential difference in volts between working electrode and reference electrode based on the Ag/AgCl reference.

EXAMPLE 2

Tests on Negative Electrode Material

The electrochemical cycling takes place in so-called half-cell arrangements. In the half-cell arrangement, the electrolyte composition of the present invention is measured in a sandwich arrangement of working electrode—separator/inventive electrolyte composition—counter/—reference electrode. The working electrode (negative electrode) used is an electrode having an electrode material consisting of 90% by weight of commercially available SFG 44 graphite from TIMCAL, SA, Switzerland and 10% by weight of polyvinylidene fluoride (PVdF) binder. A partially lithiated Li$_4$Ti$_5$O$_{12}$ spinel, to which ionic liquids are stable, was used as counter/reference electrode (positive electrode); it has a potential of 1.56 V vs. Li/Li$^+$. The potential limits used are 0 and −1.55 V, which corresponds to 10 mV and 1.56 V vs. Li/Li$^+$. The cycling rate is reported in terms of current density per active mass of the electrode material. The value used for this is 10 mA/g of graphite for the first cycle and 50 mA/g of graphite for the following cycles. Charging and discharging is effected with a current reduction on reaching the voltage limit to below a value which corresponds to 5 mA/g. The use of this current reduction makes it possible to separate the performance of an electrode (fraction of current which flows in constant current mode, or galvanostatic fraction) from possible irreversible damage (a reduction in the entire capacity, including that flowing in the potentiostatic step) (see H. Buqa et al. in *ITE Battery Letters*, 4 (2003), 38).

2.1 Attempted Lithium Intercalation without Addition of Film Former

The electrolyte composition used consists of:

100% by weight of 1-ethyl-3-methylimidazolium bis(trifluoromethanesulfonyl)imide as base component 0.5 mol/(kg of base component) of lithium bis(trifluoromethanesulfonyl)imide as conducting salt.

Figure 2A:
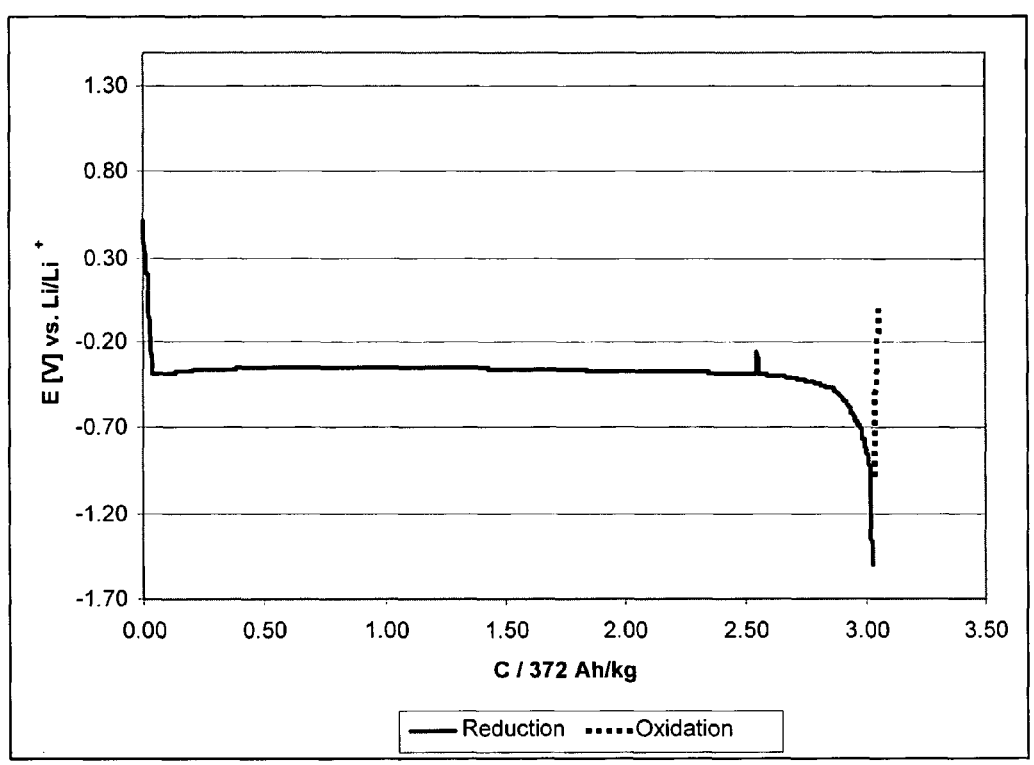
FIG. 2a shows the electrochemical potential of a composition in which intercalation of lithium into an anode is not possible.

FIG. 2a shows that intercalation of lithium into the anode material is not possible. The ionic liquid undergoes reductive decomposition at −0.3−−0.4 V (ca. 1.1-1.2 V vs. Li/Li$^+$).

2.2 Attempted Lithium Intercalation with Addition of Film Former 2.2.1 Vinylene Carbonate as Film Former (B)

a.) 10% by Weight of Vinylene Carbonate

The employed electrolyte composition of the present invention consists of:

90% by weight of 1-ethyl-3-methylimidazolium bis(trifluoromethanesulfonyl)imide and 10% by weight of vinylene carbonate as base component and 0.5 mol/(kg of base component) of lithium bis(trifluoromethanesulfonyl)imide as conducting salt.

Figure 2B:
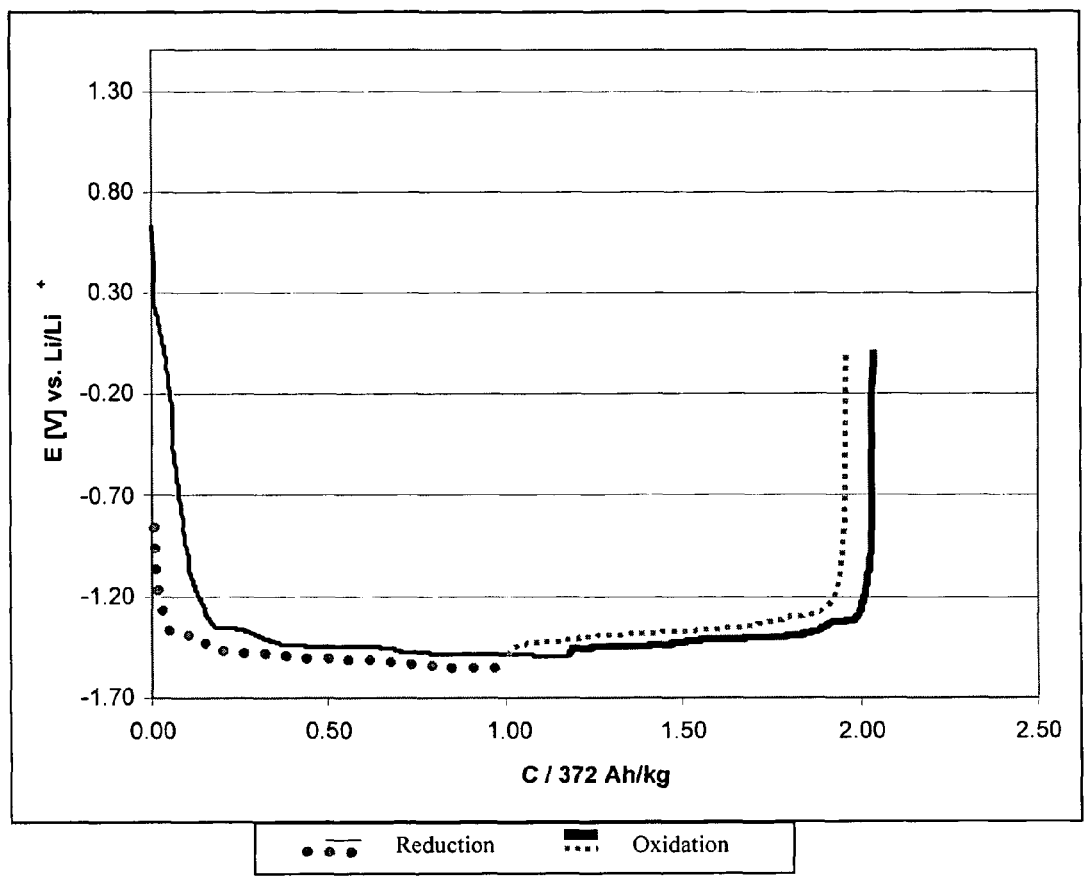
FIG. 2b shows the electrochemical characteristics of composition in which lithium is reversibly intercalated into graphite.

FIG. 2b shows that lithium is reversibly intercalated into the graphite, although in this form of graph only the first two cycles are plotted in FIG. 2b. The electrochemical capacity is approximately equal to that to be expected for complete lithiation. Lithium intercalation and deintercalation is repeatable for more than 30 cycles without loss of reversible capacity, but with still relatively irreversible losses during the cycles. This can be improved by using LiPF$_6$ as conducting salt.

In FIGS. 2a and 2b, C denotes the theoretical nominal capacity of the investigated graphite material (which is 372 mAh/g); in other words, the capacity of the graphite is reported in units of this nominal capacity. E identifies the electrochemical potential difference in volts between working electrode and counterelectrode based on the potential of lithium metal.

b.) 5% by Weight of Vinylene Carbonate

The employed electrolyte composition of the present invention consists of:

95% by weight of 1-ethyl-3-methylimidazolium bis(trifluoromethanesulfonyl)imide and 5% by weight of vinylene carbonate as base component and 0.5 mol/(kg of base component) of lithium hexafluorophosphate (LiPF$_6$) as conducting salt.

Figure 2C:
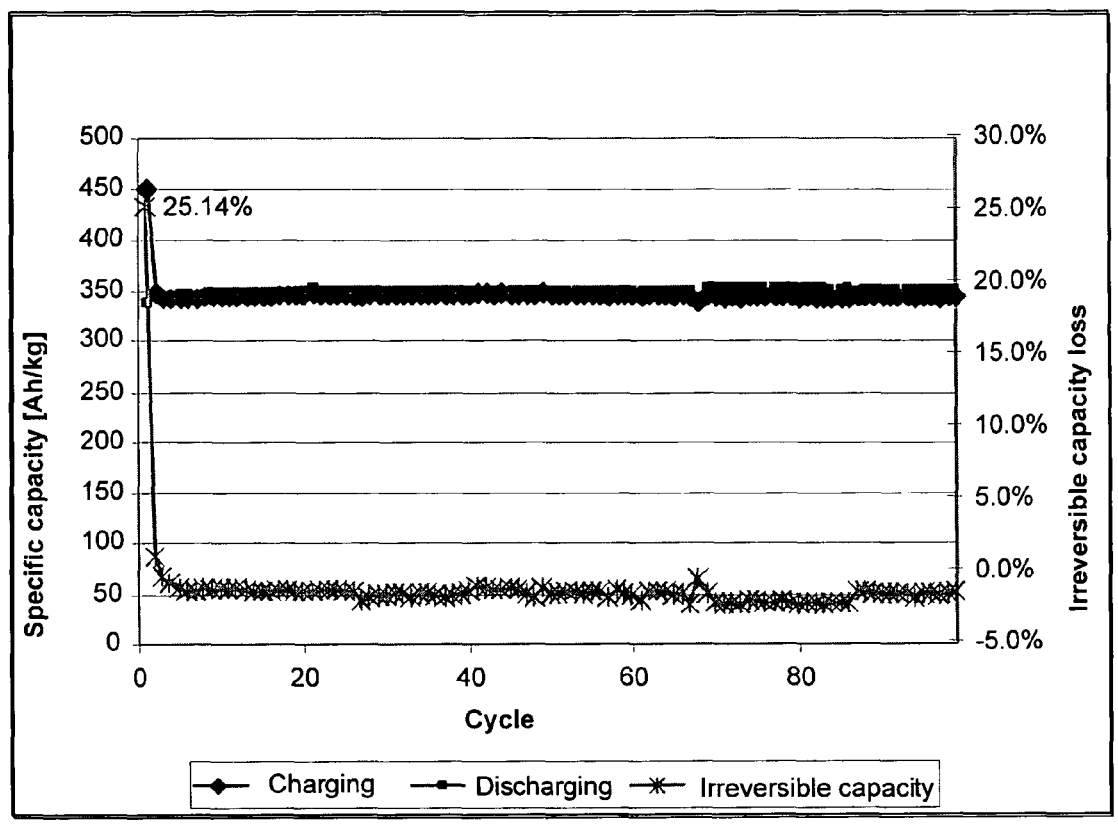
FIG. 2c shows uniform cycling of electrochemical behavior.

FIG. 2c shows uniform cycling over more than 90 cycles. Fading is not observed. Fading as used herein refers to the decrease in the reversible (useful) capacity as the number of cycles increases. Lithium intercalation is very highly reversible when using 5% by weight of vinylene carbonate.

c.) 2% by Weight of Vinylene Carbonate

The employed electrolyte composition of the present invention consists of:
  98% by weight of 1-ethyl-3-methylimidazolium bis(trifluoromethanesulfonyl)imide and
  2% by weight of vinylene carbonate
as base component and 0.5 mol/(kg of base component) of lithium hexafluorophosphate (LiPF$_6$) as conducting salt.

Figure 2D:
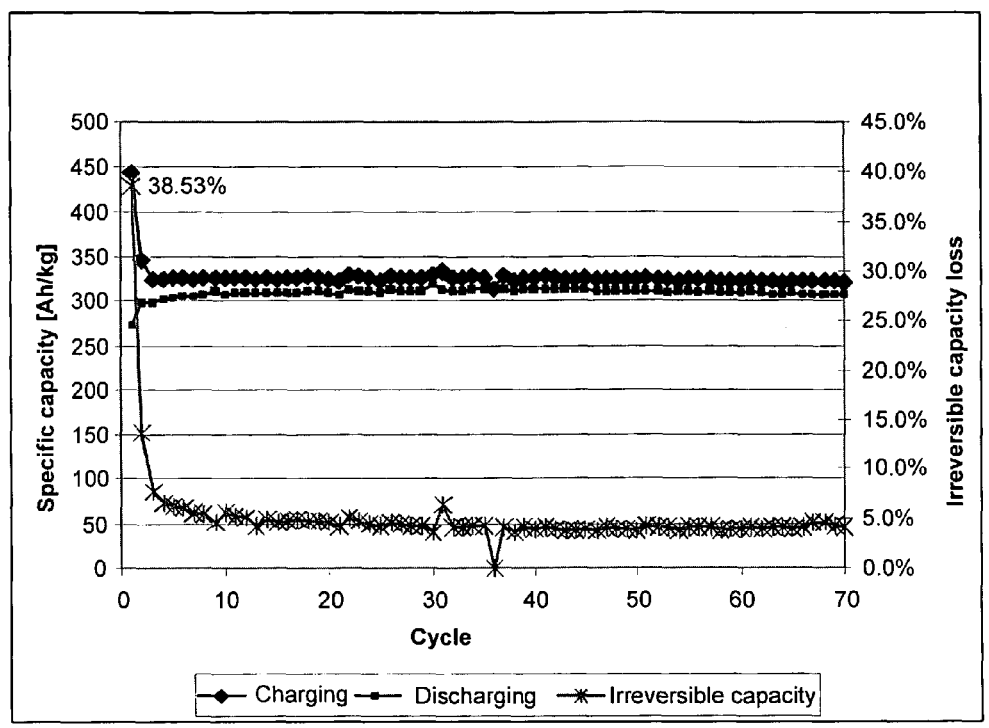
FIG. 2*d* shows an embodiment of the invention having a reduced amount of film former.

FIG. 2d shows the behavior on further reducing the film former content to 2% by weight. Cycling is still reversible with almost no fading, but irreversible losses per cycle are slightly up.

EXAMPLE 3

Tests on Cathode Material

The electrochemical cycling takes place in so-called half-cell arrangements. In the half-cell arrangement, the electrolyte composition of the present invention is measured in a sandwich arrangement of working electrode—separator/inventive electrolyte composition—counter/—reference electrode. The working electrode used is an electrode having an electrode material consisting of 86% by weight of LiCoO$_2$ in a graphite-conductive carbon black-binder matrix. A non-lithiated Li$_4$Ti$_5$O$_{12}$ spinel, to which ionic liquids are stable, is used as counter/reference electrode; it has a potential of 1.56 V vs. Li/Li$^+$. The potential limits used are 1.5 and 2.7 V, which corresponds to 3.05 and 4.25 V vs. Li/Li$^+$. The cycling rate is reported in terms of current density per active mass of the electrode material. The value used for this is 30 mA/g of LiCoO$_2$.

3.1 Attempt without Addition of Film Former
  The electrolyte composition used consists of
  100% by weight of 1-ethyl-3-methylimidazolium bis(trifluoromethanesulfonyl)imide as base component and
  0.5 mol/(kg of base component) of lithium bis(trifluoromethanesulfonyl)imide as conducting salt.

Figure 3A:
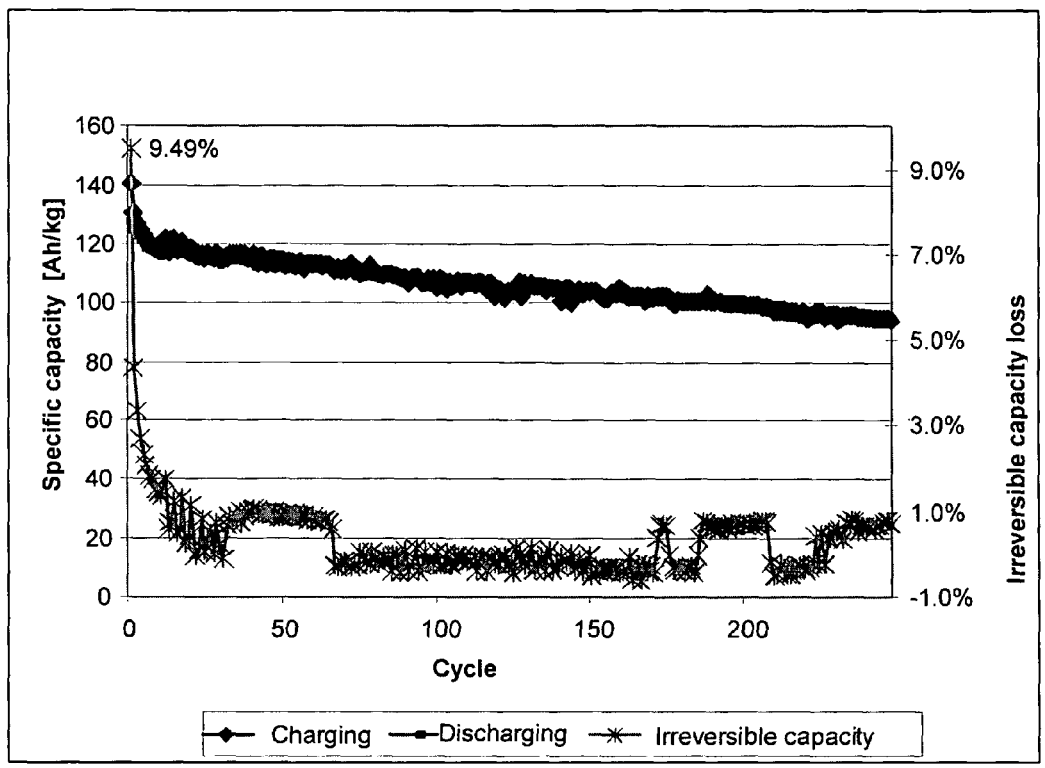
FIG. 3*a* shows an embodiment of the invention in which an electrolyte composition is without addition of film former.

FIG. 3a shows for more than 250 cycles a very low irreversible loss per cycle. Fading amounts to about 30% over the total number of cycles (250).

3.2 Attempt without Added Film Former While Raising Upper Potential Limit
  The potential limit was raised from 2.7 V by 0.2 V to 2.9 V (this corresponds to 4.45 V vs. Li/Li$^+$). The other experimental parameters are retained as per Example 3.1.

Figure 3B:
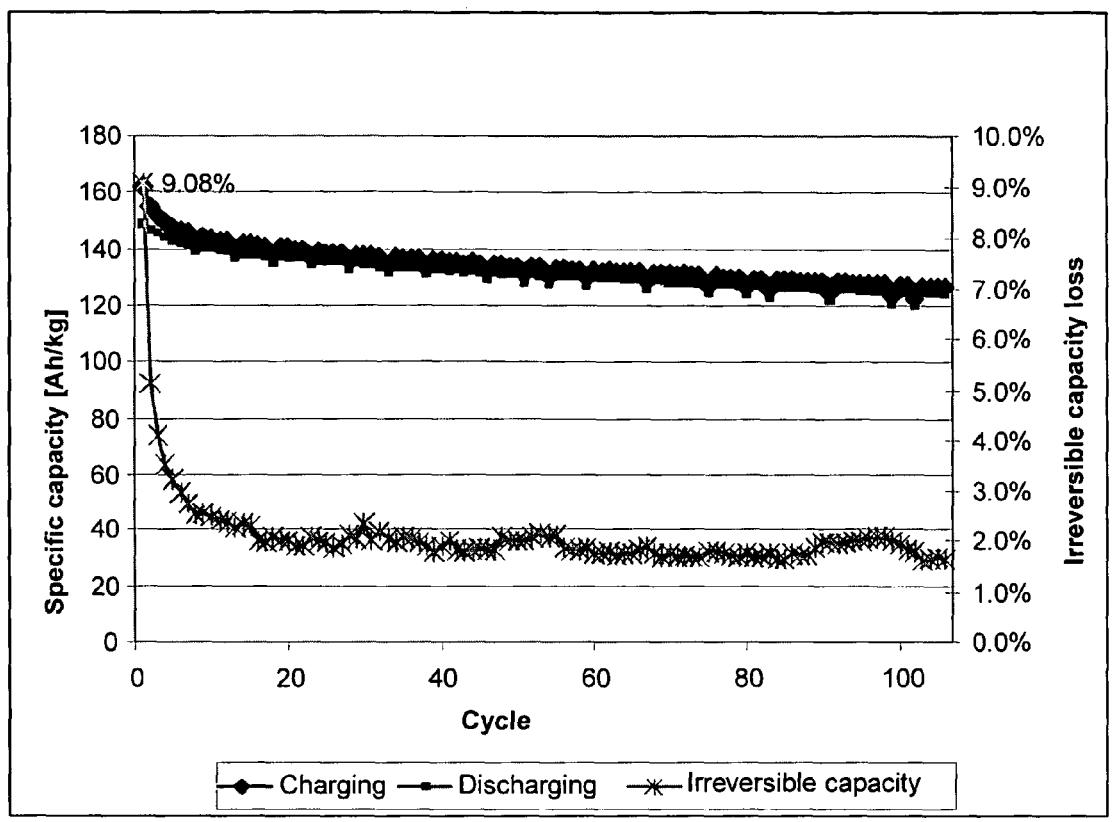
FIG. 3*b* shows the electrochemical potential of a composition without added film former.

FIG. 3b shows that the electrode remains stable, the capacity increasing by 10-20%. A somewhat higher irreversible per cycle can be reported, but fading is not worse.

3.3 Attempt with Added Film Former
  The employed electrolyte composition of the present invention consists of:
  95% by weight of imide as base component, 1-ethyl-3-methylimidazolium bis(trifluoromethanesulfonyl)imide and
  5% by weight of vinylene carbonate
as base component and 0.5 mol/(kg of base component) of lithium hexafluorophosphate (LiPF$_6$) as conducting salt.

Figure 3C:
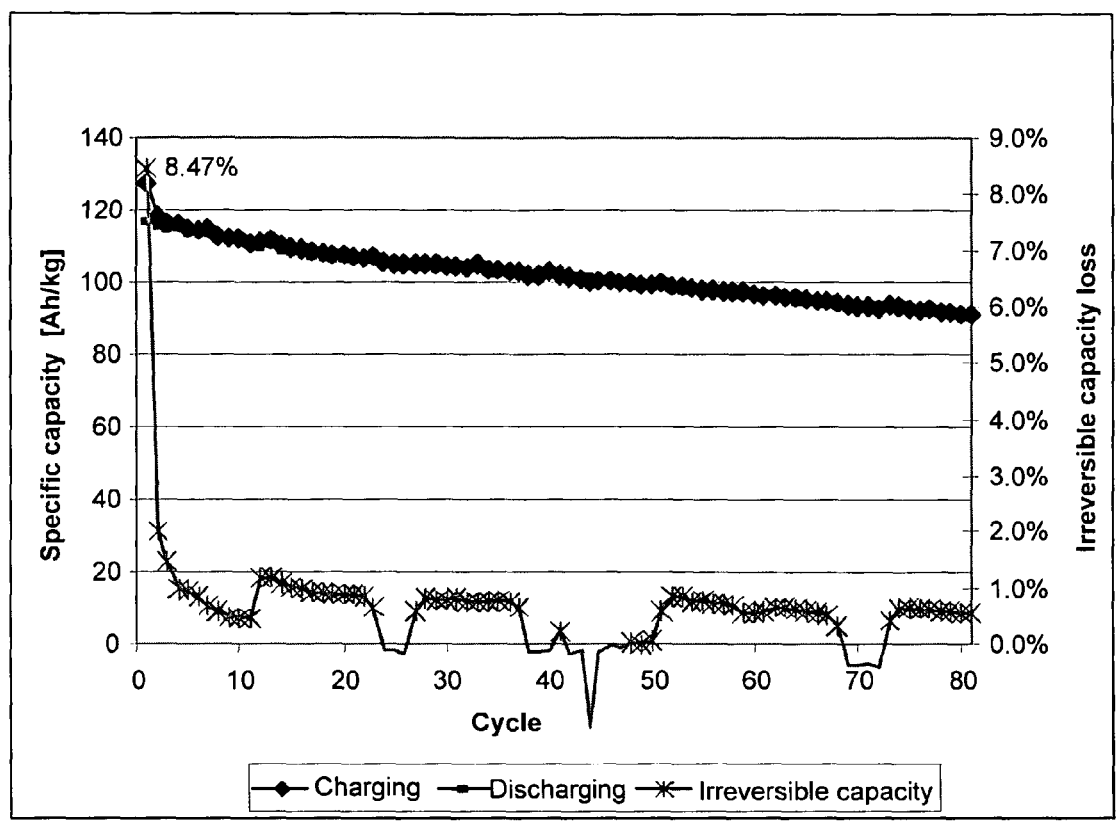
FIG. 3*c* shows the electrochemical potential of an electrolyte that is absent vinylene carbonate.

FIG. 3c shows that fading is somewhat higher than in the case of vinylene carbonate being absent from the electrolyte, but is still satisfactory.

EXAMPLE 4

Test of Complete Battery

In the cases of complete batteries, the material is measured in the full-cell arrangement of working electrode (graphite)—separator/inventive electrolyte composition—counterelectrode (LiCoO$_2$) versus the standard cathode material LiCoO$_2$. The potential limits used here range from 2.5 to 4.0 V. The cycling rate is reported in terms of current density per active mass of the graphite electrode material. The values used for this are from 10 mA/g of graphite in the first cycle and 50 mA/g of graphite in the following cycles. The cycling is done in a complete cell versus an LiCoO$_2$ electrode. In this example, the operation of a complete battery is tested using an inventive electrolyte composition consisting of:
  95% by weight of 1-ethyl-3-methylimidazolium bis(trifluoromethanesulfonyl)imide and
  5% by weight of vinylene carbonate
as base component and 0.5 mol/(kg of base component) of lithium hexafluorophosphate (LiPF$_6$) as conducting salt.

The cell is graphite limited, i.e., it accordingly runs with an excess of positive LiCoO$_2$ electrode material to compensate the irreversible losses which are higher with graphite. The reversible capacities reported in the figure are consequently on the active mass of graphite.

Figure 3D:
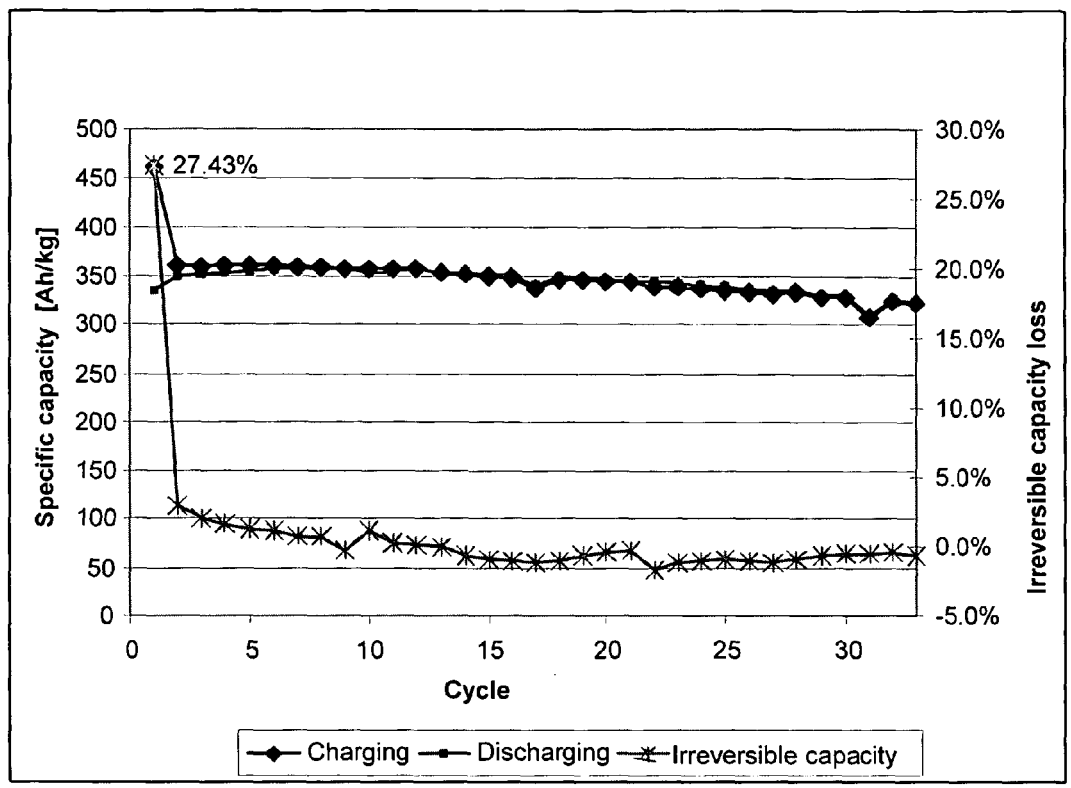
FIG. 3*d* shows a battery in which a cell performs correctly.

FIG. 3d shows that the cell performs correctly. There is some slight fading, but there are hardly any irreversible losses during the cycling.

EXAMPLE 5

Test of a Full Cell Using an Inventive Electrolyte Composition and a Ceramic Separator The electrochemical cycling took place in the half-cell arrangement—as already described in Example 2—using graphite as working electrode. The separator used was the Separion S 450 ceramic separator from Degussa AG—Creavis Technologies & Innovation. The employed electrolyte composition of the present invention consists of:
  95% by weight of 1-ethyl-3-methylimidazolium bis(trifluoromethanesulfonyl)imide and
  5% by weight of vinylene carbonate
as base component and 0.5 mol/(kg of base component) of lithium hexafluorophosphate (LiPF$_6$) as conducting salt.

Figure 3E:
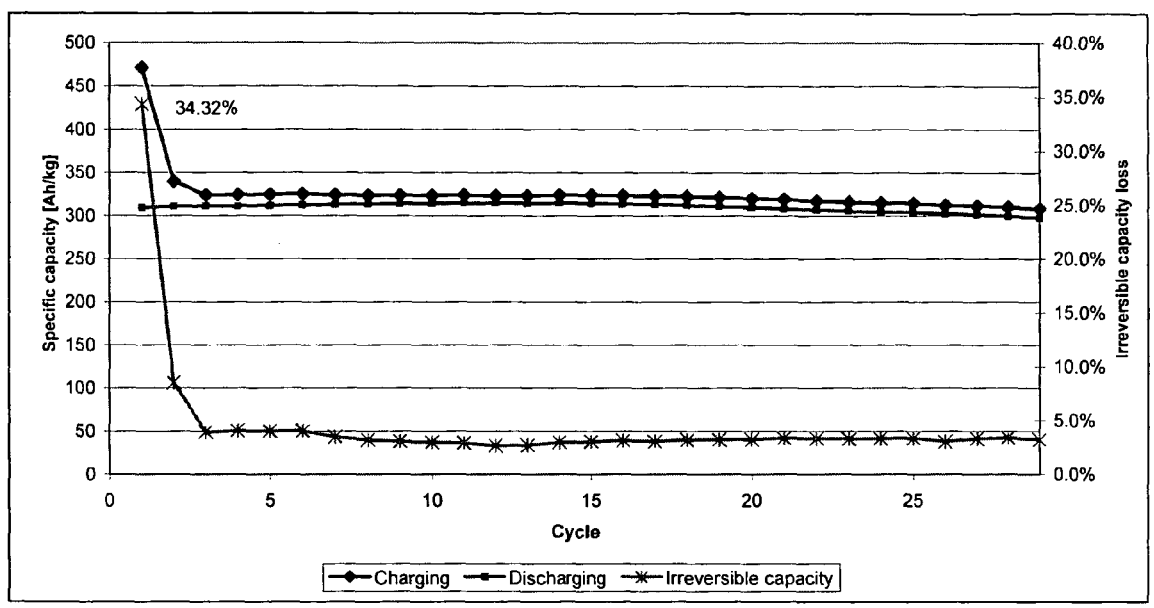
FIG. 3*e* shows an inventive electrolyte composition and its cycling behavior.

The cycling rate for this was 10 mA/g of graphite for the first cycle and 50 mA/g of graphite for the following cycles. FIG. 3e shows the cycling behavior.

EXAMPLE 6

Preliminary Tests of Thermal Stability of a Ceramic Separator Combined with the Main Constituent of the Inventive Electrolyte Composition—the Ionic Liquid (A)

A piece of the separator cut to a size of 1.5 cm×1.5 cm is dispersed in ionic liquid in a snap lid vial. These samples are first subjected to a thermal treatment by means of an oil bath. The samples of the separator are subsequently carefully cleaned of ionic liquid with ethanol and air dried. The samples of the separator are subsequently analyzed and inspected macroscopically and by means of a magnifying glass on a light table looking in particular for separator deformation, lightening and abrasion.

The following products were used as separators:
SE1 Polyolefin 6022 from ASAHI
SE2 Celgardo®2500 Microporous Membrane from Celgard
SE3 Separion S 450 from Degussa AG—Creavis Technologies & Innovation (ceramic separator)

The following products were used as ionic liquids (A):
IL1 2-Ethyl-3-methyl-2-oxazolinium methylsulfate (prepared as per the well-known reaction of 2-ethyloxazoline with dimethyl sulfate)
IL2 1-Ethyl-3-methylimidazolium bis(trifluoromethanesulfonyl)amide (prepared as per the prior art (P. Bonhote, A.-P. Dias, N. Papageorgiou, K. Kalyanasundaram, M. Graitzel, Inorg. Chem. 1996, 35, 1168; L. Cammata, S. Kazarian, P. Salter, T. Welton, Phys. Chem. Chem. Phys. 2001, 3, 5192))
IL3 Rewoquat CPEM from Goldschmidt Rewo GmbH
Rewoquat CPEM has the following structure:

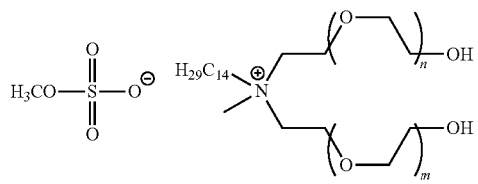

The ionic liquids have the following appearance prior to the thermal treatment together with a separator:
IL1 yellowish, clear and thinly liquid,
IL2 slightly yellowish, clear and thinly liquid, and
IL3 yellowish, clear and thickly liquid.

Tables 1 and 7 summarize the experimental parameters and also the results.

TABLE 1

| Separator | Amount of ionic liquid (in g) IL1 | Appearance of separator after thermal treatment | | |
|---|---|---|---|---|
| | | 4 h 60° C. | 4 h 60° C. + 2 h 80° C. | 4 h 60° C. + 2 h 80° C. + 2 h 100° C. |
| SE1 | 1.13 | n.a.d. | | |
| | 1.01 | | n.a.d. | |
| | 1.03 | | | shrinkage separator disintegrates lightening |
| SE3 | 1.01 | n.a.d. | | |
| | 1.02 | | n.a.d. | |
| | 1.01 | | | n.a.d. |

TABLE 2

| Separator | Amount of ionic liquid (in g) IL2 | Appearance of separator after thermal treatment | | |
|---|---|---|---|---|
| | | 4 h 60° C. | 4 h 60° C. + 2 h 80° C. | 4 h 60° C. + 2 h 80° C. + 2 h 100° C. |
| SE1 | 1.01 | n.a.d. | | |
| | 1.02 | | n.a.d. | |
| | 1.05 | | | shrinkage lightening in middle of sample |
| SE3 | 0.94 | n.a.d. | | |
| | 0.95 | | n.a.d. | |
| | 1.00 | | | n.a.d. |

TABLE 3

| Separator | Amount of ionic liquid (in g) IL3 | Appearance of separator after thermal treatment | | |
|---|---|---|---|---|
| | | 4 h 60° C. | 4 h 60° C. + 2 h 80° C. | 4 h 60° C. + 2 h 80° C. + 2 h 100° C. |
| SE1 | 1.29 | n.a.d. | | |
| | 1.29 | | shrinkage disintegration at sample corners | |
| | 1.32 | | | shrinkage |
| SE3 | 1.3 | n.a.d. | | |
| | 1.29 | | n.a.d. | |
| | 1.38 | | | n.a.d. | n.a.d.: surface of separator stable, no sign of abrasion to separator sample, no thermal shrinkage of separator nor any impairment observable.

The samples with the SE1 separator float on the ionic liquids IL1 and IL2, the ionic liquid beading off the separator sample. The separator samples had to be bedrizzled with the ionic liquid again and again during the thermal treatment. In contrast, the SE3 separator exhibits good wettability by the ionic liquids IL1 and IL2 used.

TABLE 4

| Separator | Amount of ionic liquid (in g) IL3 | Appearance of separator and of ionic liquid (A) after thermal treatment | |
|---|---|---|---|
| | | 4 h 60° C. | 4 h 60° C. + 2 h 150° C. |
| SE2 | 1.05 | | SE2: shrunk down to a hard yellow strip 1.5 cm long and 1 mm wide IL3: cognac colored, clear, thick liquid |

TABLE 4-continued

|  | Amount of ionic liquid (in g) | Appearance of separator and of ionic liquid (A) after thermal treatment | |
| --- | --- | --- | --- |
| Separator | IL3 | 4 h 60° C. | 4 h 60° C. + 2 h 150° C. |
|  | 1.02 |  | SE2: shrunk down to a hard yellow strip 1.5 cm long and 1 mm wide<br>IL3: cognac colored, clear, thick liquid |
| SE3 | 1.00 | SE3: stable, but slight abrasion by finger test<br>IL3: cognac colored, clear, thick liquid |  |
|  | 1.05 |  | SE3: stable, but slight abrasion by finger test<br>IL3: cognac colored, clear, thick liquid |

In the finger test, the mechanical stability of the separator is tested by rubbing between the fingers and subsequently the separator surface is examined under an optical microscope.

TABLE 5

|  | Amount of ionic liquid (in g) | Appearance of separator and of ionic liquid (A) after thermal treatment | |
| --- | --- | --- | --- |
| Separator | IL1 | 4 h 60° C. | 4 h 60° C. + 2 h 150° C. |
| SE2 | 0.99 | SE2: shrunk down to a hard, slightly yellow strip 1.5 cm long and 1 mm wide<br>IL1: yellow-brown, clear, thin liquid |  |
|  | 1.02 |  | SE2: shrunk down to hard, slightly yellow strip 1.5 cm long and 1 mm wide<br>IL1: yellow-brown, clear, thin liquid |
| SE3 | 1.07 | SE3: slight abrasion already visible, presumably occurred at dispersion, increased abrasion by finger test<br>IL1: yellow-brown, clear, thin liquid |  |
|  | 1.08 |  | SE3: slight abrasion already visible, presumably occurred at dispersion, increased abrasion by finger test<br>IL1: yellow-brown, clear, thin liquid |

TABLE 6

|  | Amount of ionic liquid (in g) | Appearance of separator and of ionic liquid (A) after thermal treatment |
| --- | --- | --- |
| Separator | IL2 | 4 h 60° C. |
| SE2 | 0.97 | SE2: shrunk down to hard colorless strips 1.5 cm long and 1 mm wide<br>IL2: yellowish, cloudy (schlieren), thin liquid |
| SE3 | 0.98 | SE3: stabile, n.a.d.<br>IL2: yellowish, clear, thin liquid |

The samples with the SE2 separator float on the ionic liquids IL1 and IL2, the ionic liquid beading off the separator sample. The separator samples had to be bedrizzled with the ionic liquid again and again during the thermal treatment.

The invention claimed is:

1. A porous ceramic separator, comprising:
a porous substrate and an electrolyte composition,
wherein the electrolyte composition is in and on the substrate, and wherein the electrolyte composition comprises (i) a base component consisting of
(A) 80% to 99.5% by weight of at least one ionic liquid which has a melting point of less than 100° C.,
(B) 0.5% to 10% by weight of a film former and
(C) 0% to 10% by weight of a viscosity modifier,
and (ii) a conducting salt (D) in a fraction ranging from 0.25 mol/kg of the base component to the solubility limit in the base component.

2. The separator according to claim 1, comprising a base component consisting of
(A) 90% to 99.5% by weight of at least one ionic liquid which has a melting point of less than 100° C. and
(B) 0.5% to 10% by weight of a film former.

3. The separator according to claim 1, wherein, the ionic liquid (A) comprises at least one cation selected from the group of ions consisting of ammonium, pyridinium, pyrrolidinium, pyrrolium, oxazolium, oxazolinium, imidazolium, thiazolium and phosphonium.

4. The separator according to claim 1, wherein the conducting salt (D) is a lithium compound.

5. The separator according to claim 1, wherein the conducting salt (D) is selected from the group consisting of $LiPF_6$, $LiClO_4$, $LiAsF_6$, $LiBF_4$, $LiCF_3SO_3$, $LiN(CF_3SO_2)_2$, $LiN(SO_2CF_2CF_3)_2$, $LiSbF_6$, $LiAlCl_4$, $LiGaCl_4$, $LiCl$, $LiNO_3$, $LiSCN$, $LiO_3SCF_2CF_3$, $LiC_6F_5SO_3$, $LiO_2CCF_3$, $LiFSO_3$, $LiB(C_6H_5)_4$, $LiB(C_2O_4)_2$, lithium fluoroalkylphosphate, $Li(NTf_2)$ and mixtures thereof.

6. The separator according to claim 1, wherein the film former (B) is an organic compound.

7. The separator according to claim 1, wherein the film former (B) is an organic carbonate compound.

8. The separator according to claim 7, wherein the film former (B) is vinylene carbonate.

9. An electrochemical energy storage system comprising the separator according to claim 1.

10. The electrochemical energy storage system according to claim 9, is in the form of a lithium-metal or lithium-ion battery.

11. The electrochemical energy storage system according to claim 10, is in the form of a lithium-ion battery.

12. A lithium-ion battery comprising the separator according to claim 1.

13. The porous ceramic separator according to claim 1, wherein the electrolyte composition is free of volatile constituents.

14. The porous ceramic separator according to claim 1, wherein the electrolyte composition is free of dimethyl carbonate, ethylene carbonate and ethyl methyl carbonate.

15. The porous ceramic separator according to claim 1, wherein the electrolyte composition comprises at least one selected from the group consisting of ethylene sulfite, (meth) acrylonitrile, lithium bis(oxalato)borate, lithium bis(biphenylato)borate, maleic anhydride, pyridine, dimethylacetamide, aniline, and pyrrole.

16. The porous organic separator according to claim 1, wherein the film former is at least one functionalized ionic liquid having an organic cation.

17. The porous ceramic separator according to claim 1, wherein the electrolyte composition comprises at least one of a pyridinium ion, an ammonium ion, and a phosphonium ion.

18. The porous ceramic separator according to claim 1, wherein the separator is in the form of a sheet like flexible substrate having a multiplicity of openings and having a porous inorganic coating on and in the sheet like flexible substrate.

19. The porous ceramic separator according to claim 1, wherein the electrolyte composition comprises at least one of 2-ethyl-3-methyl-2 oxazolinium methyl sulfate and 1-ethyl-3-methyl imidazolium bis(sulfonyl)amide.

* * * * *